April 29, 1952 W. L. RAUCHER Re. 23,488
CONVERTIBLE BABY CARRIAGE AND STROLLER
Original Filed Jan. 25, 1949
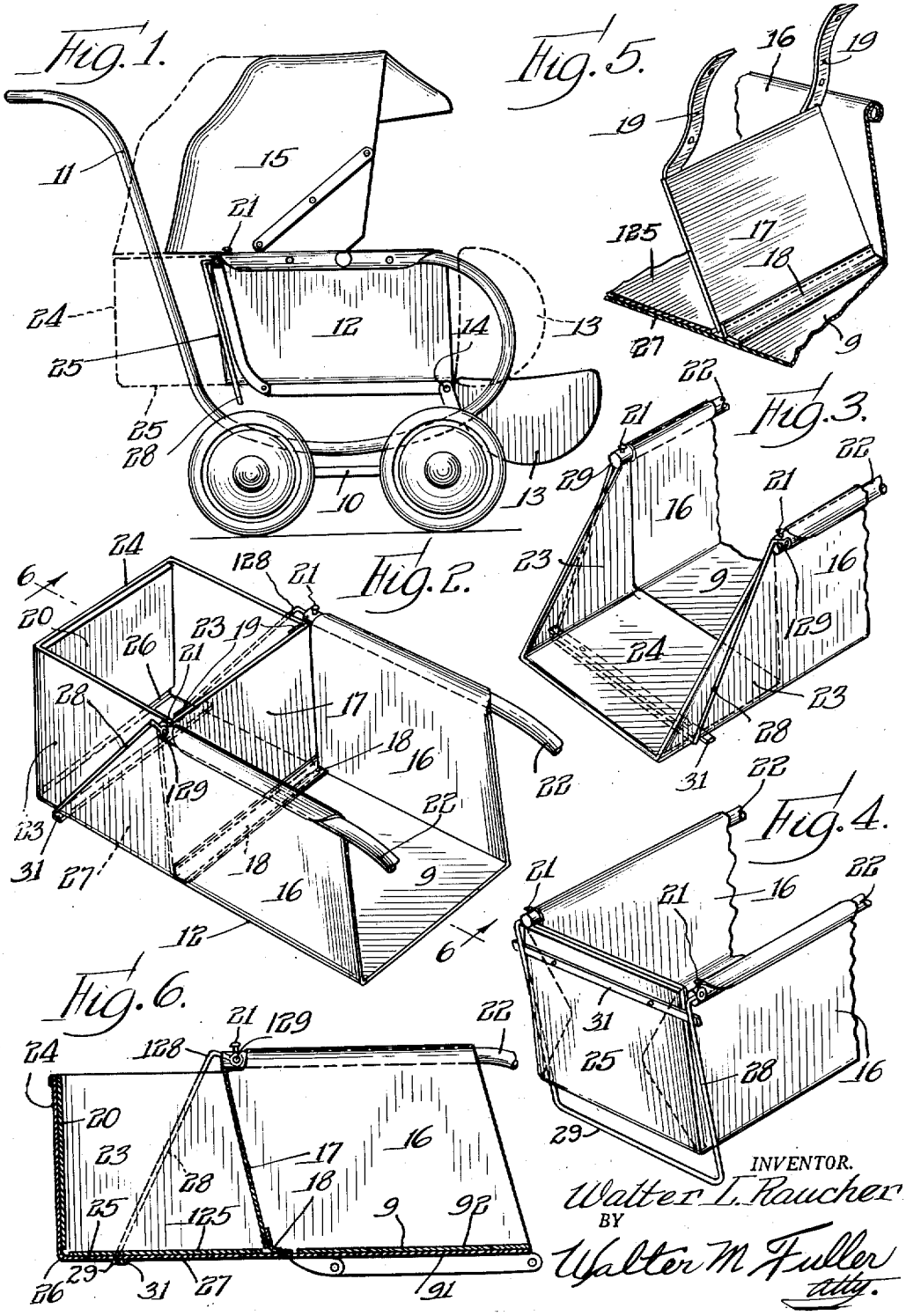
INVENTOR.
Walter L. Raucher
BY
Walter M. Fuller
Atty.

Reissued Apr. 29, 1952

Re. 23,488

UNITED STATES PATENT OFFICE 23,488

CONVERTIBLE BABY CARRIAGE AND STROLLER

Walter L. Raucher, Chicago, Ill., assignor to Helen Raucher, Chicago, Ill.

Original No. 2,494,489, dated January 10, 1950, Serial No. 72,701, January 25, 1949. Application for reissue September 22, 1950, Serial No. 186,296

12 Claims. (Cl. 296—26)

Matter enclosed in heavy brackets [ ] appears in the original patent but forms no part of this reissue specification; matter printed in italics indicates the additions made by reissue.

The current invention pertains to certain novel structural improvements and functional or operative betterments in juvenile or infant conveyances, such as baby carriages or strollers, or rather in both of such devices, in that it represents a combination of the two appliances, whereby the new vehicle can be modified or changed by reason of the innovatory characteristics supplied by the invention thus rendering the structure convertible from the baby carriage to the stroller, or vice versa, so that the apparatus may be readily and easily changed or modified to conform to the physical growth and accompanying other characteristics of the child, thus rendering the purchase of one of such con- meeting one's needs instead of requiring invest- vertible devices of this type satisfactory and ment in two different vehicles thus avoiding considerable expense.

Obviously, the conveyance should be capable of enlargement as the child to be accommodated therein naturally increases in size and proper care of the temperature and volume of the air having access to the occupant of the vehicle is necessary for the comfort, safety and health of the child, and all of these features are properly cared for by the employment of the instant invention.

*The invention further comprises and relates to the particular means employed to effect the foregoing conversions, and the structural arrangement of parts provided.*

*More particularly, one of the objects of the invention is to provide in a convertible structure of the foregoing type an arrangement whereby a pivoted back structure, for the carriage body, is arranged to occupy either of two positions, an upwardly extending position when the structure is used as a stroller, or a relatively flat position when the structure is used as a baby carriage, and wherein such pivoted back structure is associated with the main bottom of the carriage body in a manner so as to provide a windproof structure and insure safety between the back and main body parts.*

*Another object of the invention is to provide in a combined baby carriage and stroller structure, an improved arrangement of parts wherein the pivoted back structure has associated therewith in an integral manner upstanding or substantially vertical side and rear walls, whereby to provide a windproof structure, and an improved safety arrangement, when the pivoted back assembly is used in its baby carriage position; and wherein such upstanding walls provide operative connection or association with the hood of the carriage at a point well above the carriage bottom so that the hood, or any parts thereof, need not be relied upon to insure a complete windproof and safe rear compartment structure when the device is in baby carriage position.*

The new device can be used under certain circumstances also to accommodate packages or other bodies such as groceries, etc., in addition to the child.

In order that those skilled in this art may have full knowledge of the mechanical properties of the new device and the accompanying benefits incorporating the present invention may be readily understood, a current preferred embodiment of the invention in satisfactory, convenient, and desirable physical form has been illustrated in the accompanying drawing described in the following specification and in which drawing like parts or elements have been supplied with the same reference numerals throughout the several figures of the drawing.

In such drawing:

Figure 1 is a side view of the new appliance in one only of its several adjustments in full lines;

Figure 2 shows a fragmentary perspective view of the novel rear portion of the main body of the vehicle;

Figure 3 presents a perspective view of the back part of the carriage with its elements in a somewhat different partially folded relation;

Figure 4 displays a view similar to that of Figure 3 with the elements thereof in still a different fully folded or converted condition;

Figure 5 portrays a perspective view of the foldable or hinged back-wall of the carriage in an unsecured or unlocked condition; and Figure 6 depicts a vertical section on line 6—6 of Figure 2, as viewed in the direction indicated by the arrows.

Referring first to Figure 1, it will be noted that 10 is the ordinary or well-known wheel-equipped chassis of the baby carriage, 11 constituting that part of the vehicle by which it is manually pushed and guided, 12 comprising the main body of the carriage mounted on such chassis 10, 13 being its foldable or adjustable foot well hinged in any approved manner at 14 on the body of the vehicle for use in lowered relation as presented in Figure 1, or in raised position covering the front of the body 12, and 15 being its collapsible longitudinally adjustable hood, all of which, so far as displayed in such figure, being of well-known, ordinary or any suitable usual construction.

Such body 12 comprises a suitable, flat, rectangular base or bottom 9 (Figs. 2, 3, 5 and 6) and its two side-walls 16, 16 (see also Figs. 2, 3, 4, 5 and 6) are equipped with a rectangular back-wall or closure 17 hinged at 18 on said base 9 (Figs. 2, 5 and 6) so that it may be rocked vertically to different positions to convert the infant carriage from a baby carriage into a stroller in which the occupant is of sufficient age and capacity to sit upright or recline more or less while in the vehicle.

This base 9 of such main body may be formed of an underlayer of suitable material, such as real or artificial leather 91, equipped with a superposed sheet 92 of stiff material, the two layers being secured together in any approved manner (Fig. 6).

Such back 17 may be held upright or in one or more rearwardly sloping relations by the application of apertures in its two tabs 19, 19 (Figs. 2 and 5) over fixed studs 21, 21 on rigid members 22, 22 (Figs. 1, 2, 3, 4, and 6) of the vehicle. In Figure 2 the straps or tabs 19, 19 are shown broken away so as to better portray other portions of the structure.

An infant will ordinarily begin to sit up in the cariage at from eight to twelve months of age and thereafter, as a rule, does not sleep in the carriage.

Then, the compartment about to be described, behind the child, becomes a handy carry-all for packages, groceries, etc. (Figs. 2 and 6).

When the child becomes older, the mother ordinarily does not usually wish to push a full-size baby carriage and she then collapses the convertible back, as shown in Fig. 4, to obtain a regular stroller as indicated in full lines in Figure 1.

But, if she decides to do her shopping she can convert the collapsible back or extension into a package carrier at a moment's notice and without disturbing the child's comfort.

This feature is capable of being satisfactorily used on collapsible, semi-collapsible and other carriages.

It comprises two foldable, flexible, air-tight and rain-tight side-walls 23, 23 of any suitable or appropriate material, such as leather, a substantially rigid, thin, rectangular end-wall 24, preferably integral with the rear ends of side walls 23, 23 and a suitably supported foldable bottom-wall 25, all of such four walls being substantially rectangular or square.

Such bottom-wall 25 may consist of a lower layer 27 of suitable material, such as leather or fabric, and desirably forming an integral extension of the material 91 forming part of base 9 of the main body of the carriage, this same material also forming an integral part of the back-wall 24 which wall is desirably provided with a stiffening stratum 20 fastened thereto, the bottom wall or extension 25 having a stiffening layer 125 fastened to the stratum 27.

This rearward extension having the three upstanding walls 23, 23, 24 is supported in the relation shown in Figure 6 by a metallic U-shaped yoke 28 on whose intermediate straight section 29 the bottom-wall 25 rests adjacent to the metallic bar 31 fastened to the bottom of wall 25 (Figs. 4 and 6), and is of a length wider than the distance between the two sides of such yoke, the yoke 28 having its upper ends curved at 128 and rockingly mounted in any approved manner at the two points 129 (Figs. 2 and 6) so that it may swing vertically.

When the vehicle is to accommodate a very young infant on a pad or cushion and the foot well is in the upper dotted position shown in Figure 1 forming a forward extension of the main body of the carriage, the back 17 may be retained in upright position and under these conditions the space to the rear of such wall 17 may or may not be employed for the accommodation of packages or other articles, the parts of such extension having been unfolded and occupying the relations shown in Figures 2 and 6, the top of such compartment being covered, protected, and concealed by the hood 15 which may be partially folded temporarily to permit access to such space.

On the other hand, if such extension space is needed for occupation by such child the wall 17 may be released and folded down on top of its bottom-wall 25 and be occupied in part by the child, supplemented, if desired, by one or more packages or articles.

To convert the vehicle into a stroller, in which case the child sits up in the carriage instead of lying down therein, the back-wall 17 is held erect and may be turned down on the bottom 25 of the extension which has previously been lowered into place and supported by its yoke 28, as presented in Figures 2 and 6.

Thereafter, the back-wall 24 is turned down on top of wall 17, the two flexible side-walls 23 being folded into triangular halves (Figure 3) and then the bottom-wall 25 is folded up erect, such previously folded sections of the side-walls passing forwardly into the main body of the carriage, whereupon the yoke 28 swings down to vertical position by itself, or is pushed down into such place, holding all of the members 17, 24 and 25 as compact, erect, overlying elements, as shown in Figures 1 and 4, accommodating the child sitting on any suitable introduced pad, and under such circumstances the hood 15 can be pushed forwardly so that it does not overhang the rear end of the main body of the carriage, and the foot well is in its lowered position and occupied by the child's feet.

It will be understood, of course, that the bottom-wall 25 is prevented from rocking down out of place because the yoke 28 by engagement of its cross-rod 31 prevents such an occurrence.

It will be appreciated also that neither of the side-walls 23 are visible from the outside of the vehicle under these conditions.

If, however, the one handling the vehicle desires to use the extension for the accommodation of purchases, it can be readily unfolded and used for that purpose employing the backwall 17 in place by its straps, as shown in Figures 2 and 6.

*It will thus be seen that the structure has essentially three positions, viz., a stroller position as shown in Figure 4, a position as shown in Figure 6 wherein the body back member 17 is in stroller position but the extension 20 provides an auxiliary package carrier, and a position like that shown in Figure 6 except with the back member 17 downwardly folded or horizontal whereby to provide a*

*maximum length in a baby carriage arrangement. The members 17 and 25 are integrally united with the main body bottom 9 whereby to provide a windproof structure at the point of juncture between these parts at all times, whether the structure is in stroller or baby carriage position. Further, with the rear extension 20 unfolded as shown in Figure 6, with the back member 17 either up or down, the rear wall 24 and side walls 23 of the extension 20 are so united with the main carriage body that a windproof and safe arrangement of parts is provided so that the baby is afforded improved protection, and any packages being carried cannot become inadvertently lost. There is no possibility that either the baby or packages can fall out of the structure when going up or down curbs or uneven ground, regardless of how the carriage body may be tilted.*

*Still further, it will be noted that the line of juncture or operative connection between the extension 20 and the hood is well above the bottom of the body, viz., it is at the plane of the top of the body, and no depending appurtenances of the hood are relied upon to form a part of the body or the extension 20. By this means the hood can be shifted to any desired position, to provide any desired sun shading independently of the position of the extension 20, and there are no depending appurtenances on the hood interconnecting with the extension 20 which might become dislodged if relied upon to form a part of the body enclosure, and which in any event form unsightly appurtenances which must be rolled up or tucked away when not in use. The extension 20 is thus self-contained, and while cooperating with the hood is structurally independent thereof, the extension itself providing a windproof and safe body part independent of any parts of or appurtenances on the hood 15.*

From the foregoing description it will be readily seen that I have produced such a device as substantially fulfills the objects of the invention presented herein, but while such specification sets forth in detail the present and preferred construction of the appliance still in practice such deviations from such details may be resorted to without departing from the heart and spirit of the invention as evidenced by the appended claims, or, stated otherwise, various minor changes could be made in various features without sacrificing the heart and essence of the invention as defined by the claims herewith presented:

In some instances the material known to the trade at leatherette, which is a weather-proof material, can be conveniently and suitably used as that referred to as real or artificial leather in constructing the portion of the vehicle constituting the current invention.

I claim:

1. In a convertible baby carriage having a wheel-chassis, a main body having a base and upstanding side-walls on said chassis, a hood on said main body, a back-rest hinged transversely on said base to rock thereon, and means to hold said back-rest in adjusted positions, the novel combination of a rigid rearward base-extension hinged transversely on said base in substantially longitudinal registration with said base, flexible side-walls in register substantially with the side-walls of said main body, an upstanding rigid back-wall of said extension hinged transversely on said extension and connecting the rear edges of the side-walls of said extension, means to support said extension in substantial horizontal register with the base of said main body whereby said back-rest of said main body may be folded down into said extension, said extension back-wall then folded down onto said main body back-rest on said extension causing folding of said extension side-walls, said extension and its superposed back and back-rest then folded up to take the former place of said main back-rest, said extension side-walls passing into the main body of the carriage thereby, whereupon the supporting means for said extension may be moved against said extension to hold it in place, the baby carriage having been thus converted into a stroller.

2. The construction presented in claim 1, in which said back-rest when folded down flat on the base extension to be occupied by a part of the child when the child is in full length position, the space provided by the extension and its walls including its rockable back-rest when in upright position being capable of use for accommodating packages and sundry articles.

3. The novel combination set forth in claim 1, in which such means for holding said extension in its two different positions comprises a U-shaped hinged element and a bar fastened to said extension and projecting beyond the sides of said U-shaped element.

4. The novel combination set forth in claim 1, in which the baby carriage has a foot well adjustably mounted at the front of the carriage to be used as a closure for the front end of the carriage or in a lower portion for the accommodation of the feet of the occupant when the carriage is in the form of a stroller.

5. The novel combination set forth in claim 1, in which portions of the base of the main body of the carriage, the base of the extension, and the back wall of the extension are integral.

6. The novel combination set forth in claim 1, in which the side-walls of the main body of the carriage and the side-walls of the extension are integral.

*7. A convertible baby carriage and stroller comprising a wheel-chassis, a main body having a base and upstanding side-walls on said chassis, and an extension arranged to extend rearwardly from the body, said extension comprising a bottom-wall hinged to the rear of the base and arranged to lie substantially in the plane thereof when in lowered position, end and side-walls secured to the margins of the bottom-wall and extending upwardly substantially vertically therefrom when the bottom-wall is in a lowered position, said bottom-wall being substantially equal in width to the base of the main body and being pivotal to an upstanding supporting position, means for retaining the bottom-wall in said upstanding position against movement to its lowered position, and a foot well shiftably mounted at the front of the carriage to be used as a closure for the front end thereof or in a lower position for the accommodation of the feet of the occupant when the carriage is in the form of a stroller.*

*8. A convertible baby carriage and stroller comprising a wheel-chassis, a main body having a base and upstanding side-walls on said chassis, and an extension arranged to extend rearwardly from the body, said extension comprising a bottom-wall hinged to the rear of the base and arranged to lie substantially in the plane thereof when in lowered position, end and side-walls secured to the margins of the bottom-wall and extending upwardly substantially vertically therefrom when the bottom-wall is in a lowered position, said bottom-wall being pivotal to an up-*

*standing supporting position, means selectively operable to retain the bottom-wall in its upstanding position forming a stroller back rest and in its lowered position forming a carriage base extension selectively as desired, and a foot well shiftably mounted at the front of the carriage to be used as a closure for the front end thereof or in a lower position for the accommodation of the feet of the occupant when the carriage is in the form of a stroller.*

*9. A convertible baby carriage and stroller comprising a wheel-chassis, a main body having a base and upstanding side-walls on said chassis, a hood pivotally connected to the body, and an extension arranged to extend rearwardly from the body, said extension comprising a bottom-wall hinged to the rear of the base and arranged to lie substantially in the plane thereof when in lowered position, and end and side-walls secured to the margins of the bottom-wall and extending upwardly substantially vertical therefrom when the bottom-wall is in a lowered position, the end and side-walls of the extension when said bottom-wall is in lowered position lying respectively in the planes of the end and side walls of the hood when the hood is in one given position, and said bottom, end and side-walls of the extension when said bottom-wall is in lowered position forming with the main body an elongated container structure into which a baby or other articles may be placed and securely held.*

*10. A convertible baby carriage and stroller comprising a wheel-chassis, a main body having a base and upstanding side-walls on said chassis, a hood connected to the body, an extension arranged to extend rearwardly from the body, said extension comprising a bottom-wall hinged to the rear of the base and arranged to lie substantially in the plane thereof when in lowered position and to close the rear end of the main body when in raised position, end and side-walls secured to the margins of the bottom-wall and extending upwardly therefrom when the bottom-wall is in a lowered position, the end and side-walls of the extension when said bottom-wall is in a lowered position forming substantial continuations of the corresponding hood walls when the hood is positioned over the extension, said bottom, end and side-walls of the extension when said bottom-wall is in lowered position forming with the main body an elongated container structure into which a baby or other articles may be*

*placed and securely held, and closure means for the front end of the main body when used as a carriage, said closure means being shiftable to open the front end of the carriage and accommodate the occupant's depending feet when used as a stroller with the bottom-wall of the extension in raised position.*

*11. A convertible baby carriage and stroller comprising a wheel-chassis, a main body having a base and upstanding side-walls on said chassis, an extension arranged to extend rearwardly from the body, said extension comprising a bottom-wall connected to the rear of the base and arranged to lie substantially on the plane thereof when in lowered position, end and side-walls secured to the margins of the bottom-wall and extending upwardly therefrom when the bottom-wall is in a lowered position, the bottom, end and side-walls of the extension when said bottom-wall is in lowered position forming with the main body an elongated container structure into which a baby or other articles may be placed and securely held, and a closure connected to the front end of the main body for movement between a position closing the same when used as a carriage and a position depending therefrom when used as a stroller to permit the feet of the occupant to also depend from the base.*

*12. A convertible baby carriage and stroller as claimed in claim 11, wherein the upper margins of said extension end and side-walls form a three-sided angular structure terminating substantially in the plane of the upper margins of the upstanding side-walls of the main body, and wherein the closure for the front end of the main body includes a foot rest to accommodate the occupant's depending feet when used as a stroller.*

WALTER L. RAUCHER.

REFERENCES CITED

The following references are of record in the file of this patent or the original patent:

UNITED STATES PATENTS

| Number | Name | Date |
|---|---|---|
| 1,807,235 | Brown | May 26, 1931 |
| 2,055,890 | Berry | Sept. 29, 1936 |

FOREIGN PATENTS

| Number | Country | Date |
|---|---|---|
| 244,356 | Great Britain | Dec. 17, 1925 |